US011203859B1

(12) United States Patent
Greenwood

(10) Patent No.: US 11,203,859 B1
(45) Date of Patent: Dec. 21, 2021

(54) TOILET TANK ADJUSTABLE BRACE

(71) Applicant: Daniel R. Greenwood, Dalton, NH (US)

(72) Inventor: Daniel R. Greenwood, Dalton, NH (US)

( * ) Notice: Subject to any disclaimer, the term of this patent is extended or adjusted under 35 U.S.C. 154(b) by 25 days.

(21) Appl. No.: 16/814,854

(22) Filed: Mar. 10, 2020

Related U.S. Application Data

(60) Provisional application No. 62/819,643, filed on Mar. 17, 2019.

(51) Int. Cl.
*E03D 1/26* (2006.01)
*F16B 5/02* (2006.01)

(52) U.S. Cl.
CPC . *E03D 1/26* (2013.01); *F16B 5/02* (2013.01)

(58) Field of Classification Search
CPC ..... E03D 1/26; E03D 1/012; Y10T 29/49815; Y10T 29/49826; Y10T 29/49947
See application file for complete search history.

(56) References Cited

U.S. PATENT DOCUMENTS

| 1,464,398 | A | 8/1923 | Ahern |
| 2,233,342 | A | 2/1941 | Crozier |
| 2,283,794 | A | 5/1942 | Crozier |
| 2,810,136 | A | 10/1957 | Kearney |
| 3,666,225 | A | 5/1972 | Weinberger |
| 6,728,976 | B1 | 5/2004 | Halloran et al. |
| 8,701,221 | B2 | 4/2014 | Topcu |
| 9,095,241 | B1 | 8/2015 | Abbuhl |
| 9,315,318 | B2 | 4/2016 | Allen et al. |
| 10,081,935 | B2 | 9/2018 | Beck et al. |
| D829,873 | S | 10/2018 | Booth |
| 10,190,299 | B2 | 1/2019 | Vadnais |
| 10,435,879 | B1 | 10/2019 | Orsano et al. |
| 2004/0133969 | A1* | 7/2004 | Akin ...................... E03D 11/14 4/252.2 |

FOREIGN PATENT DOCUMENTS

| CA | 933907 A | 9/1973 |
| GB | 2110260 A * | 6/1983 ........... E03D 1/0125 |

* cited by examiner

*Primary Examiner* — Jason L Vaughan
*Assistant Examiner* — Amanda Kreiling
(74) *Attorney, Agent, or Firm* — Jeffrey E. Semprebon; Semprebon Patent Services

(57) ABSTRACT

A toilet tanks can be stabilized by an adjustable brace that is adjustably securable to and passes through a wall of the tank, and which can extend beyond the tank to engage a nearby structural wall surface. The amount of extension can be adjusted to match the distance from the tank wall to the structural wall in a particular situation.

12 Claims, 6 Drawing Sheets

TOILET TANK ADJUSTABLE BRACE

FIELD OF THE INVENTION

An adjustable brace is disclosed for stabilizing a toilet tank relative to a wall, the brace being readily adjustable to match the distance to the wall.

BACKGROUND

Toilets typically consist of a base, mounted to the floor of a bathroom, and a tank mounted onto the base. The tank is frequently subject to stresses by the user, such as the user leaning back against the tank, causing a torque on the tank which may result in breaking the seal between the tank and the base. To prevent such torqueing, it is desirable to brace the tank, such as against a nearby wall, to prevent movement of the tank and support it in position against leaning back by the user. Examples of toilet tank braces are taught in U.S. Pat. Nos. 2,810,136; 3,666,225; 10,081,935; 10,190,299; and 10,435,879.

SUMMARY

A support brace for a toilet tank can be provided by at least one elongated brace element that passes through a tank wall of a toilet tank, in combination with a mounting structure that is adjustably positionable along the brace element and configured to engage the tank wall so as to set the length of extension of the brace element beyond the tank wall when so engaged. The at least one brace element can be positioned relative to the mounting structure so as to extend into contact with a structural wall located near the tank wall, thereby providing a support to brace the tank against torques. A pair of horizontally spaced-apart brace elements can be employed to stabilize that tank, in which case each brace element passes through the tank wall, which is engaged by a mounting structure associated with the brace element and adjustably positionable therealong so as to set the extension of the brace element beyond the tank wall.

Each brace element can have an enlarged foot for spreading force on the structural wall. The brace element can have a threaded shaft, in which case the mounting structure can include a pair of washers for bracketing and engaging the tank wall and a pair of nuts threadably positionable along the threaded shaft.

A toilet tank with stabilizing elements can be provided, having a tank wall with at least one passage extending therethrough, at least one elongated brace element that can pass through the passage so as to extend beyond the tank wall, a mounting structure adjustably positionable along the brace element and configured to engage the tank wall so as to set the length of extension of the brace element beyond the tank wall when so engaged. Two horizontally-spaced brace elements can be employed, each passing through a passage in the tank wall. Each brace element can have an enlarged foot for spreading force on the structural wall. The brace element can have a threaded shaft, in which case the mounting structure can include a pair of washers for bracketing and engaging the tank wall and a pair of nuts threadably positionable along the threaded shaft.

DETAILED DESCRIPTION

To provide additional stability for a toilet tank, an adjustable brace can be added with a brace element that extends beyond the tank wall to engage a nearby wall. Engagement of the brace element with the structural wall serves to stabilize the tank in the event that a user applies force against the tank, such as by leaning back on it.

In a typical situation, a pair of brace elements are employed, horizontally spaced apart to prevent pivoting about a single point, and the brace elements extend through the rear wall of the tank to engage a structural wall or similar vertical surface positioned behind the toilet. Each brace element is adjustably mounted to the tank wall by a mounting structure that engages the tank wall, and which is adjustably positionable along the length of the brace element; in effect, this allows adjusting the length to which the brace element extends beyond the tank wall, allowing the installer to extend the brace element until it contacts the structural wall, and then secure it in position with respect to the tank wall.

Figure 1:
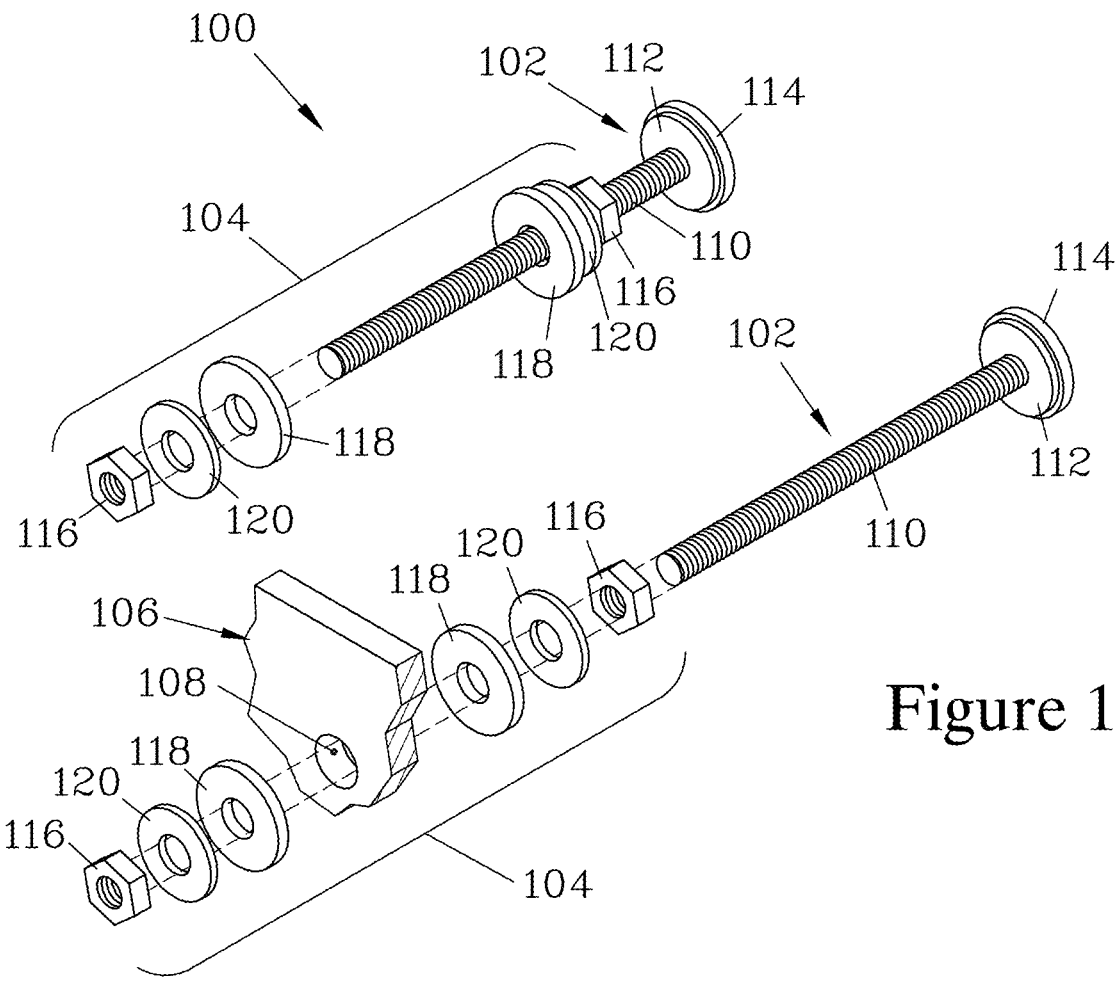
FIG. 1 illustrates the components of an adjustable brace that functions in cooperation with a toilet tank. The brace has a pair of brace elements and a pair of mounting structures.
Figure 2:
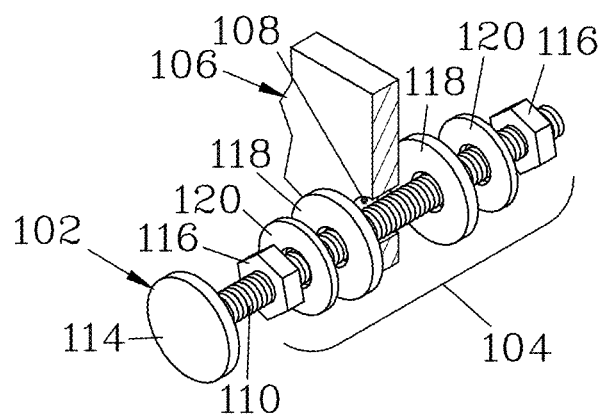
FIG. 2 illustrates one of the brace elements and one of the mounting structures shown in FIG. 1.

FIG. 1 illustrates a support brace 100 having a pair of brace elements 102 and a pair of mounting structures 104, for use with a toilet tank, represented in FIGS. 1 & 2 by a section of tank wall 106. The tank wall 106 is provided with two passages 108 (only one of which is shown in FIGS. 1 and 2), which can be positioned above the level of water in the tank. Such passages 108 could be provided by drilling, but due to the effort required to bore through porcelain, it is typically preferred to provide the passages 108 in the tank when it is fabricated.

Each of the brace elements 102 in this example is formed as a bolt having a threaded shaft 110 and an enlarged foot 112 which can be brought into contact with a structural wall located near the tank. The foot 112 serves to spread the force and avoid damage to the structural wall, and can be provided with foot pad 114 of a deformable material such as rubber, neoprene, polyurethane, etc. FIG. 1 shows the brace elements and mounting structures 104 looking outward from a viewpoint inside the tank, while FIG. 2 shows one of the brace elements 102 and associated mounting structures looking inward from a viewpoint outside the tank.

The mounting structure 104 typically employs one or more threaded elements that engage the threading on the shaft 110 to allow adjustment of the brace element 102 relative to the tank wall 106. In the brace 100 the mounting structure 104 has a pair of nuts 116 that thread onto the shaft 110. When installed, the nuts 116 reside on either side of the tank wall 106, and can be tightened into position to clamp against the tank wall 106 when the brace element 102 is at its desired extension, with the foot pad 114 contacting the structural wall. Compressible washers 118 of a suitable material such as rubber, neoprene, polyurethane, etc. are interposed between each of the nuts 116 and the tank wall 106 to spread the clamping force and prevent damage to the tank. Rigid washers 120 can be interposed between the nuts 116 and the compressible washers 118 to more evenly distribute the clamping force when the nuts 116 are tightened on the threaded shaft 110.

Figure 3:
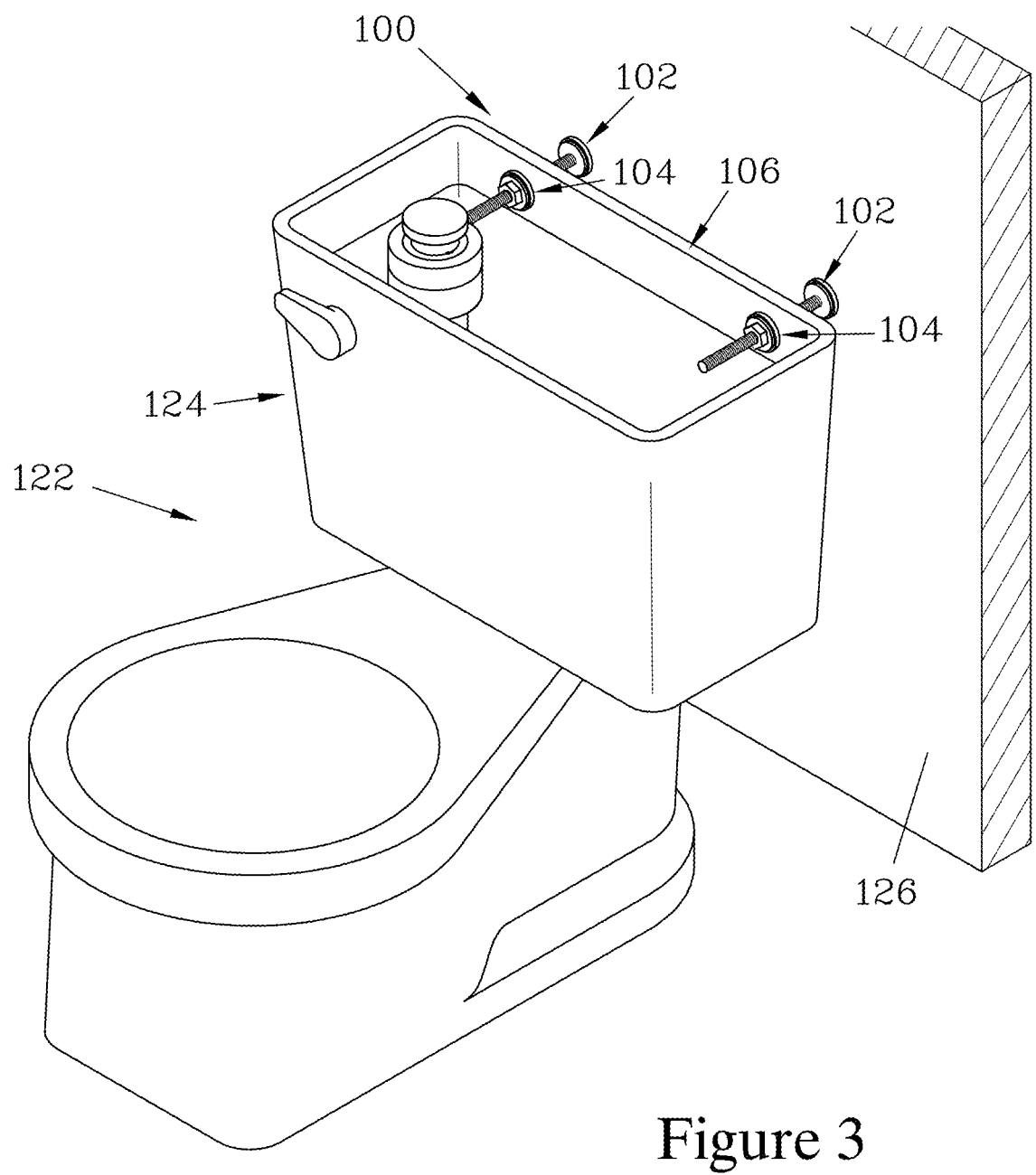
FIG. 3 illustrates a toilet with the brace structure shown in FIG. 1 installed thereon to stabilize a toilet tank against a structural wall.
Figure 4:
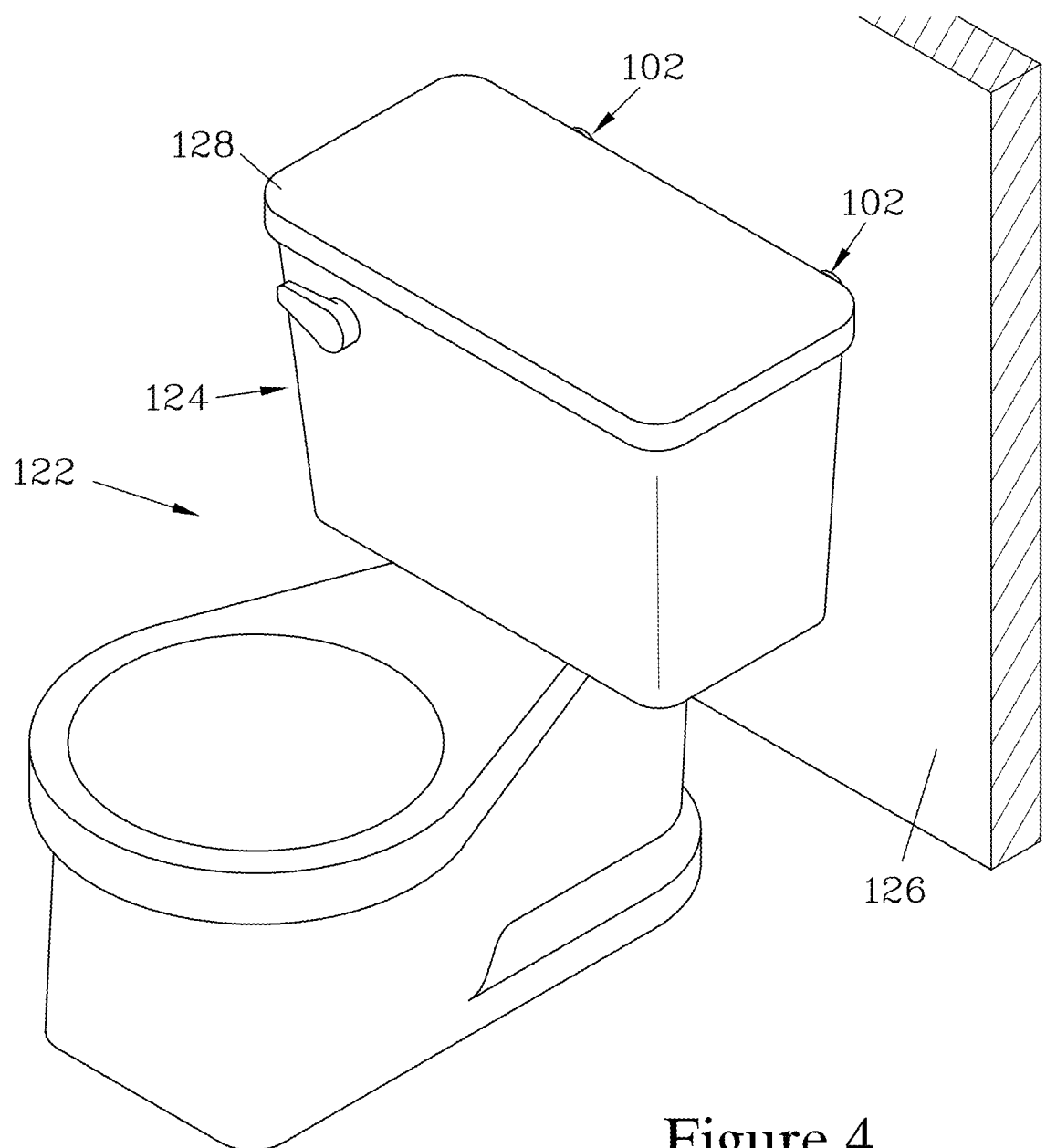
FIG. 4 illustrates the toilet and brace shown in FIG. 3 after a tank lid has been installed; the brace is not readily visible from most viewing angles.

FIGS. 3 and 4 illustrate the brace 102 when installed into a toilet 122, having a toilet tank 124 of which the tank wall 106 is a part. The tank wall 106 is installed close to a structural wall 126 of the building in which the toilet 122 is installed. The brace elements 102 pass through the passages 108 in the tank wall 106, and are secured thereto by the mounting structures 104. The brace elements 102 extend beyond the tank wall 106 a sufficient distance to contact the structural wall 126, thereby bracing the toilet tank 124 against torques that would result from a user leaning back against the tank 124.

While the use of compressible washers 118 clamped against the tank wall 106 by the combined threaded shafts 110, rigid washers 120, and nuts 116 such as shown should deform to form watertight seals against the tank wall 106, it is generally preferred to position the passages 108 in the tank wall 106 above the water level in the tank 106, as shown in FIG. 3 (although the passages 108 themselves are not visible in this view). This position reduces leakage in the event that the mounting structure 104 needs to be loosened to adjust the position of the brace element 102 while the tank 106 is filled, as well as reducing the risk of corrosion of the brace element 102 and the rigid components (116, 120) of the mounting structure. In many cases, locating the passages 108 three inches (~75 mm) below the top edge of the tank wall 106 is an effective location. To further reduce corrosion, these elements (102, 116, 120) can be made from a relatively corrosion-resistant material such as brass, bronze, stainless steel, or a high-strength polymer.

FIG. 4 shows the toilet 122 when a tank lid 128 has been installed. The tank lid 128 mostly conceals the protruding portions of the brace elements 102, providing the brace 100 with a very low visual profile, which is unnoticed from most viewing angles.

Figure 5:
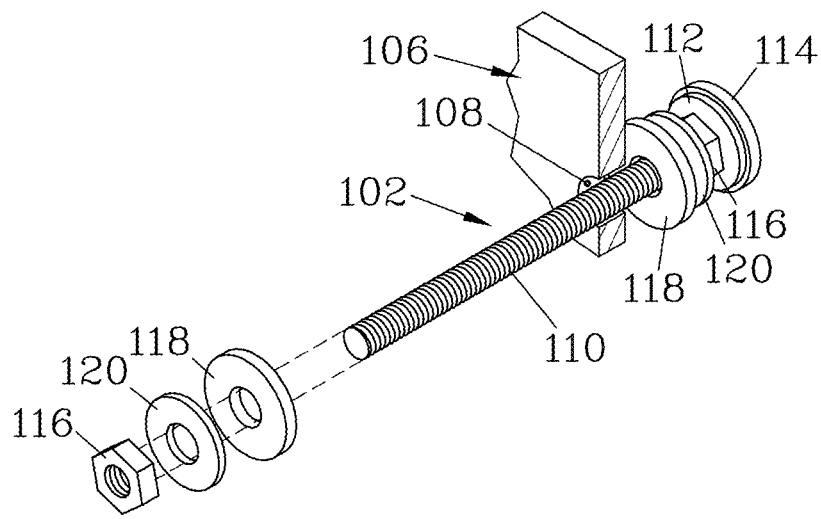
FIGS. 5-8 are partial section views that illustrate an installation sequence for a brace element and mounting structure employed in a typical situation.

FIGS. 5-8 illustrate the steps in a typical installation of one of the brace elements 102 and associated mounting structures 104 of the brace 100 shown in FIGS. 1 and 3. First, as shown in FIG. 5, one of the nuts 116, rigid washers 120, and compressible washers 118 are placed in that order onto the brace element 102. The nut 116 is threaded to a position close to the foot 112. The threaded shaft 100 of the brace element 102 is then inserted through the passage 108 in the tank wall 106, leaving the installed nut 116, rigid washer 120, and compressible washer 118 outside of the tank 124. This insertion of these elements (102, 116, 118, 120) for both brace elements 102 may be most conveniently done prior to securely attaching the tank 124 to the base of the toilet 122.

Figure 6:
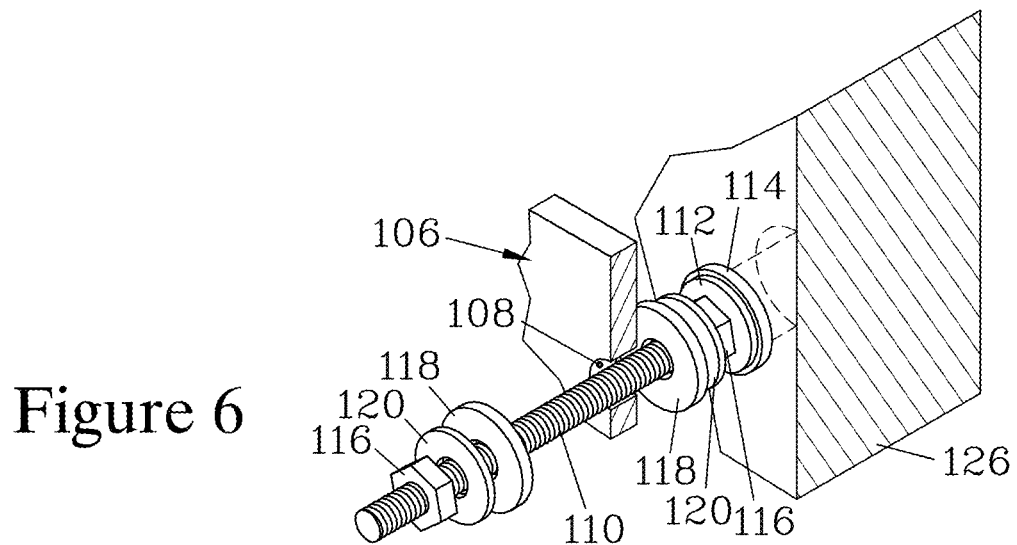

Once the threaded shaft 110 has been inserted through the passage 108, the remaining elements (116, 118, 120) of the mounting structure 104 are installed onto the threaded shaft. In order, the remaining compressible washer 118, rigid washer 120, and nut 116 are installed onto the shaft 110, as shown in FIG. 6, residing inside the tank 124. However, they are only loosely applied, to allow the brace element 102 sufficient free motion to bring it into contact with the nearby structural wall 126.

Figure 7:
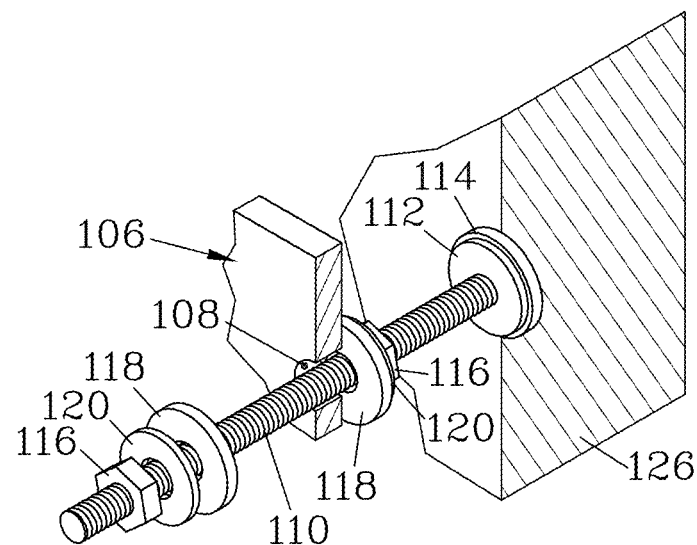
Figure 8:
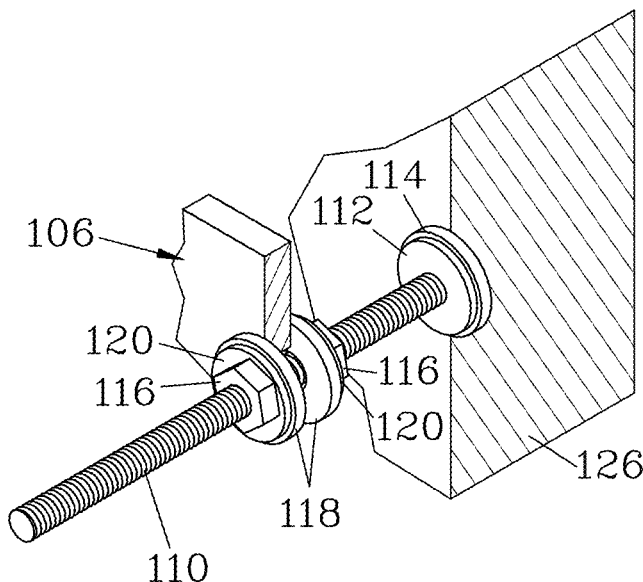

Prior to adjusting the position of the two brace elements 102, the tank 124 should be securely attached to the base of the toilet 122 (this could be done prior to installing the compressible washer 118, rigid washer 120, and nut 116 that reside inside the tank 124). After the tank 124 has been secured, the brace element 102 is extended to place the foot pad 114 against the structural wall 126. The outer nut 116 is then turned to adjust its position along the shaft 110 to force the outer compressible washer 118 against the outside of tank wall 106, as shown in FIG. 7. The inner nut 116 is then turned to adjust its position along the shaft 110 to force the inner compressible washer 118 against the inside of the tank wall 106, as shown in FIG. 7. When both brace elements 102 have been affixed in such manner to the tank wall 106 by their associated mounting structures 104, installation of the brace 100 is complete, and the tank lid 128 can be installed.

Figure 9:
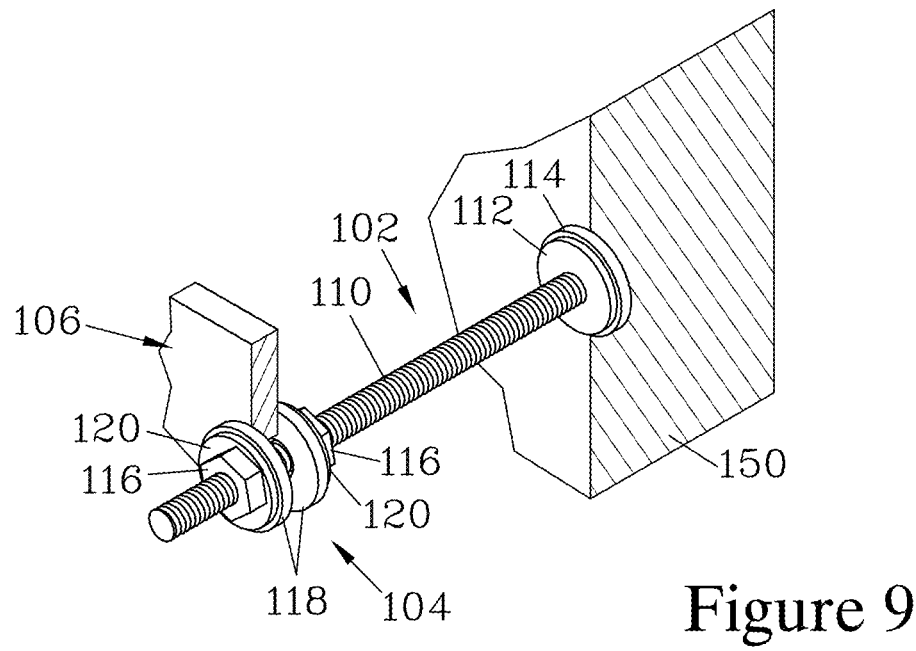
FIG. 9 is a partial section view illustrating the same brace element and mounting structure as shown in FIGS. 5-8, but employed in a situation where the wall is positioned further away from the tank, requiring the brace element to be extended further than is shown in FIGS. 5-8.

FIG. 9 illustrates the same brace element 102 and mounting structure 104 as shown in FIGS. 2 and 5-7, but installed in a situation where the separation between the tank wall 104 and a structural wall 150 is greater than in the situation shown in FIGS. 5-8. In FIG. 9, the brace element 102 extends further beyond the tank wall 106 in order to contact the structural wall 150, and the elements (116, 118, 120) of the mounting structure 104 are positioned on the shaft 100 to correspond to this greater extension of the brace element 102. When a greater separation exists, the brace elements 102 could be replaced with longer bare elements having a longer threaded shaft.

Figure 10:
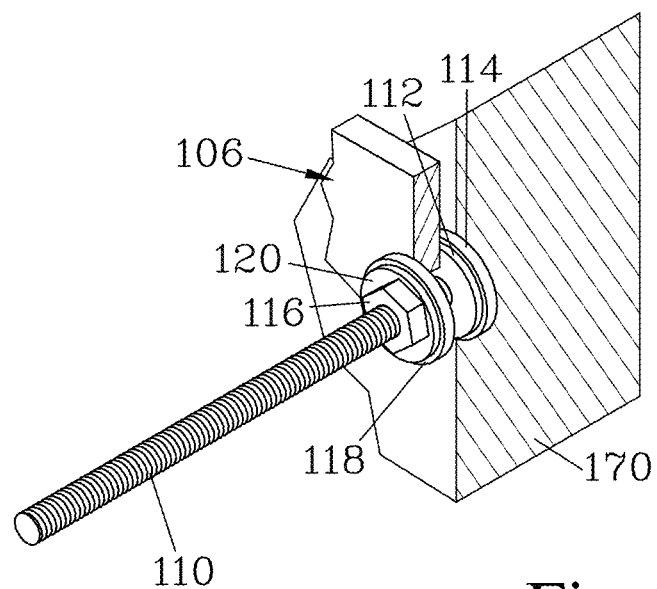
FIG. 10 is a partially sectioned view of a brace element employed in a situation where the tank is positioned very close to the wall; in this situation, there is insufficient space to accommodate a nut and washer between the tank wall and the head of the bolt.

FIG. 10 illustrate the brace element 102 employed in a situation where the tank wall 106 is located too close to a structural wall 170 to accommodate a nut 116, compressible washer 118, and rigid washer 120 outside the tank wall 106, interposed between the tank wall 106 and the foot 112 of the brace element 102. In this case, the brace element 102 has been inserted into the passage 108 without having these outer elements (116, 118, 120) mounted thereon, and after the tank 124 has been secured to the base of the toilet 122, the inner compressible washer 118, rigid washer 120, and nut 116 are tightened on the shaft 110 against the tank wall 106. If the spacing were slightly greater, one or more compressible washers 118 and/or rigid washers 120 could be placed on the brace element 102 outside the tank 124 to set the appropriate spacing of the foot pads 114 from the tank wall 106 to contact the structural wall 170.

In one prototype, the brace elements were each provided by a ¼" diameter 4" long bolt (~6 mm dia.×100 mm long), with an enlarged foot, such as a conventional bolt employed for mounting the toilet base to a closet flange where the enlarged head which would normally engage the closet flange serves as the foot. These bolts were provided with 1" (~25 mm) diameter rubber pads adhered to the head. Each mounting structure in the prototype consisted of a pair of rubber washers, a pair of stainless steel washers, and ¼" brass nuts. While a mixture of materials were employed in the prototype, the rigid parts could be formed from various corrosion-resistant materials, and typically will all be formed from a similar material. The use of 4-inch long brace elements was found to accommodates a maximum separation of 3¼ inches between the tank wall and the structural wall, sufficient to cover most cases for newly-installed toilets. When employed without any inner mounting structure elements (the situation shown in FIG. 10), the prototype brace elements could be employed for tanks as close as 1/8" (~3 mm) to the structural wall.

For the prototype described above, the recommended installation instructions are as follows:

Set tank on bowl.

FOR DISTANCES OFF THE WALL UP TO 3¼":

Install a nut all the way on each bolt.

Install stainless washer to each bolt.

Install rubber washer to each bolt.

Install bolts through brace passages in back of tank (outside to inside—the nut and washers are positioned outside the tank).

Install rubber washer to each bolt inside the tank.

Install stainless washer to each bolt inside the tank.

Start remaining nut onto the end of the bolt shank inside the tank. (Do not tighten yet.)

Install tank to bowl.

Touch ends of bolts to wall.

Snug back nuts (nuts outside of tank) to engage the washers snug against the exterior of the tank.

Snug inside nuts to bring the washers snug against the inside of the tank.

Install lid.

FOR CASES WHERE THE TANK IS TOO CLOSE TO THE WALL:

Install ¼" bolts through holes in back of tank. (outside to inside; typically, this will require rocking the tank forward to provide space to insert the bolts.)

Install a rubber washer to each bolt inside the tank (if the separation is sufficiently greater than the thickness of the foot of the bolt, one or more rubber washers can be placed on the bolt outside the tank to take up the extra space).

Install a stainless washer to each bolt inside the tank.

Install a nut to each bolt and snug the washers against the interior of the tank.

Install tank to bowl.

Install lid.

It should be noted that, when the brace is employed near its minimum extension, most of the length of the brace element is inside the tank. While typical toilet tanks have ample space to accommodate the brace elements, special brace elements that are shorter may be needed in the cases of tanks that have internal structure, such as to provide a pressurized flush. Such tanks may also require care in locating the brace passages to avoid the brace elements or the mounting structure interfering with the proper functioning of the tank. Brace elements can be provided in various lengths to accommodate situations where there is internal structure inside the tank and/or for various distances to the structural wall.

The invention claimed is:

1. A support brace comprising:
    at least one elongated brace element that passes through a tank wall of a toilet tank; and
    a mounting structure adjustably positionable along said brace element and configured to engage the tank wall so as to set the length of extension of said brace element beyond the tank wall when so engaged,
        whereby said at least one brace element can be positioned relative to said mounting structure to extend into contact with a structural wall located near the tank wall.

2. The support brace of claim 1 wherein said at least one elongated brace element further comprises a pair of horizontally spaced-apart brace elements, each passing through the tank wall and engaging an associated mounting structure.

3. The support brace of claim 2 wherein each of said brace elements further comprises:
    an enlarged foot for spreading force on the structural wall.

4. The support brace of claim 2 wherein each of said brace elements further comprises a threaded shaft, and
    further wherein each of said mounting structures further comprises a pair of washers for bracketing and engaging the tank wall of the tank, and a pair of nuts threadably positionable along said threaded shaft.

5. A toilet tank with stabilizing elements, comprising:
    a tank wall having at least one brace passage therethrough;
    at least one elongated brace element that passes through said brace passage so as to extend beyond said tank wall; and
    a mounting structure adjustably positionable along said brace element and configured to engage said tank wall so as to set the length of extension of said brace element beyond the tank wall when so engaged,
        whereby said at least one brace element can be positioned relative to said mounting structure to extend into contact with a structural wall located near said tank wall.

6. The toilet tank of claim 5 wherein said at least one elongated brace element further comprises a pair of horizontally spaced-apart brace elements, each passing through a brace passage in said tank wall and each engaging an associated mounting structure.

7. The toilet tank of claim 6 wherein each of said brace elements further comprises:
    an enlarged foot for spreading force on the structural wall.

8. The toilet tank of claim 6 wherein each of said brace elements further comprises a threaded shaft, and
    further wherein each of said mounting structures further comprises a pair of washers for bracketing and engaging said tank wall, and a pair of nuts threadably positionable along said threaded shaft.

9. A support brace comprising:
    at least one elongated brace element that passes through a tank wall of a toilet tank; and
    a mounting structure having opposed elements that reside on either side of the tank wall and are adjustably positionable along said brace element such that they can be tightened along the brace element to clamp against the tank wall so as to set the length of extension of said brace element beyond the tank wall,
        whereby said at least one brace element can be positioned relative to said mounting structure to extend into contact with a structural wall located near the tank wall.

10. The support brace of claim 9 wherein said at least one elongated brace element further comprises a pair of horizontally spaced-apart brace elements, each passing through the tank wall and engaging an associated mounting structure.

11. The support brace of claim 10 wherein each of said brace elements further comprises:
    an enlarged foot for spreading force on the structural wall.

12. The support brace of claim 10 wherein each of said brace elements further comprises a threaded shaft, and
    further wherein each of said mounting structures further comprises a pair of washers for bracketing and engaging the tank wall of the tank, and a pair of nuts threadably positionable along said threaded shaft.

* * * * *